United States Patent
MacAonghusa et al.

(10) Patent No.: US 11,563,823 B2
(45) Date of Patent: Jan. 24, 2023

(54) SYSTEMS AND METHODS FOR DEVICE CONNECTIVITY MANAGEMENT

(71) Applicant: VeriFone, Inc., San Jose, CA (US)

(72) Inventors: Ciarán MacAonghusa, Dublin (IE); Aidan Totterdell, Bray (IE)

(73) Assignee: VERIFONE, INC., Wilmington, DE (US)

( * ) Notice: Subject to any disclaimer, the term of this patent is extended or adjusted under 35 U.S.C. 154(b) by 0 days.

(21) Appl. No.: 16/698,515

(22) Filed: Nov. 27, 2019

(65) Prior Publication Data
US 2021/0160336 A1    May 27, 2021

(51) Int. Cl.
*H04L 67/562*    (2022.01)
*H04L 67/145*    (2022.01)

(52) U.S. Cl.
CPC .......... *H04L 67/562* (2022.05); *H04L 67/145* (2013.01)

(58) Field of Classification Search
CPC .......................... H04L 67/2809; H04L 67/145
See application file for complete search history.

(56) References Cited

U.S. PATENT DOCUMENTS

| | | | | |
|---|---|---|---|---|
| 10,474,497 | B1 * | 11/2019 | Kancharla | G06F 9/4875 |
| 2003/0233537 | A1 * | 12/2003 | Wohlgemuth | H04L 67/306 |
| | | | | 713/151 |
| 2010/0080226 | A1 * | 4/2010 | Khalid | H04L 41/5003 |
| | | | | 370/392 |
| 2014/0286354 | A1 * | 9/2014 | Van De Poel | H04L 41/0273 |
| | | | | 370/463 |
| 2015/0281374 | A1 * | 10/2015 | Petersen | H04L 67/16 |
| | | | | 709/223 |
| 2016/0085488 | A1 * | 3/2016 | Otake | H04N 1/00127 |
| | | | | 358/1.14 |
| 2016/0294967 | A1 * | 10/2016 | Reveron | H04L 67/63 |
| 2017/0223593 | A1 * | 8/2017 | Koodli | H04W 36/18 |
| 2018/0014241 | A1 * | 1/2018 | Perdomo | H04L 67/52 |

(Continued)

OTHER PUBLICATIONS

International Search Report, dated Jan. 4, 2021, from corresponding International Application No. PCT/US2020/060476.

(Continued)

*Primary Examiner* — John A Follansbee
*Assistant Examiner* — Kamal M Hossain
(74) *Attorney, Agent, or Firm* — Bond, Schoeneck & King, PLLC (57) ABSTRACT

Devices and methods for device connectivity management are disclosed. According to one embodiment, a system for device connectivity management may include a plurality of client devices, each client device supporting a plurality of communication channels; and a broker in communication with each of the client devices over each supported communication channel, the broker comprising at least one computer processor. Each client may send a subscription message to the broker over each supported communication channel. The broker may send each subscribed client a keep alive message over each subscribed supported communication channel, and may broker publish a status message to each subscribed client over each subscribed supported communication channel for a non-responding client. One of the plurality of clients may execute an action in response to the status message.

20 Claims, 5 Drawing Sheets

(56) References Cited

U.S. PATENT DOCUMENTS

| | | | | |
|---|---|---|---|---|
| 2018/0159752 A1* | 6/2018 | Fratini | ................ | H04L 43/0811 |
| 2018/0234902 A1* | 8/2018 | Talbert | .................. | H04W 36/14 |
| 2019/0173951 A1* | 6/2019 | Sumcad | .................. | H04L 67/55 |
| 2019/0288975 A1* | 9/2019 | Hara | ..................... | H04L 51/214 |
| 2020/0104161 A1* | 4/2020 | Kapur | ................ | G06F 11/2041 |
| 2020/0107226 A1* | 4/2020 | Raleigh | ................ | H04W 28/02 |

OTHER PUBLICATIONS

Written Opinion of the International Searching Authority, dated Jan. 4, 2021, from corresponding International Application No. PCT/US2020/060476.

International Preliminary Report on Patentability for PCT Application No. PCT/US2020/060476, dated May 17, 2022, pp. 1-7.

\* cited by examiner

SYSTEMS AND METHODS FOR DEVICE CONNECTIVITY MANAGEMENT

BACKGROUND OF THE INVENTION

1. Field of the Invention

The present disclosure relates generally to systems and methods for device connectivity management.

2. Description of the Related Art

Point of sale devices often support multiple communication channels, such as ethernet, Wi-Fi, GSM radio, and Bluetooth. Should one of these channels fail or be compromised, it may go unnoticed until the next transaction attempt. This may lead to transaction delays.

SUMMARY OF THE INVENTION

Devices and methods for device connectivity management are disclosed. According to one embodiment, a system for device connectivity management may include a plurality of client devices, each client device supporting a plurality of communication channels; and a broker in communication with each of the client devices over each supported communication channel, the broker comprising at least one computer processor. Each client may send a subscription message to the broker over each supported communication channel. The broker may send each subscribed client a keep alive message over each subscribed supported communication channel, and may broker publish a status message to each subscribed client over each subscribed supported communication channel for a non-responding client. One of the plurality of clients may execute an action in response to the status message.

In one embodiment, at least one of the plurality of client devices executes an agent, and the agent may execute the action.

In one embodiment, the communication channels may include ethernet, Wi-Fi, GSM radio, Bluetooth, etc.

In one embodiment, the action may be for the client to change from a first communication channel to a second communication channel, to perform maintenance, etc.

In one embodiment, the system may further comprise a central monitoring service that communicates the action for the client to execute.

In one embodiment, the plurality of clients may include a plurality of point of sale devices.

According to another embodiment, in an information processing apparatus comprising at least one computer processor, a method for device connectivity management may include: (1) receiving, from a plurality of clients and over a plurality of communication channels supported by each client, a subscription message; (2) communicating, to each subscribed supported communication channel, a keep alive message; and (3) publishing a status message to each subscribed client over each subscribed supported communication channel for a non-responding client. One one of the plurality of clients may execute an action in response to the status message.

In one embodiment, an agent executed by the client executes the action.

In one embodiment, the communication channels may include ethernet, Wi-Fi, GSM radio, Bluetooth, etc.

In one embodiment, the action is for the client to change from a first communication channel to a second communication channel, for the client to perform maintenance, etc.

In one embodiment, the method may include a central monitoring service communicating the action for the client to execute.

In one embodiment, the plurality of clients may include a plurality of point of sale devices.

According to another embodiment, a client comprising at least one computer processor, a method for device connectivity management, may include: (1) sending, to a broker comprising at least one computer processor, a subscription message over a plurality of communication channels supported by the client; (2) receiving, from the broker and over each subscribed supported communication channel, a keep alive message; (3) receiving, from the broker and over at least one of the subscribed communication channels, a status message indicating a non-responsive communication channel; and (4) executing an action in response to the status message.

In one embodiment, an agent executed by the client may executes the action.

In one embodiment, the communication channels may include ethernet, Wi-Fi, GSM radio, Bluetooth, etc.

In one embodiment, the action may be for the client to change from a first communication channel to a second communication channel, for the client to perform maintenance, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for device connectivity management.

Figure 1:
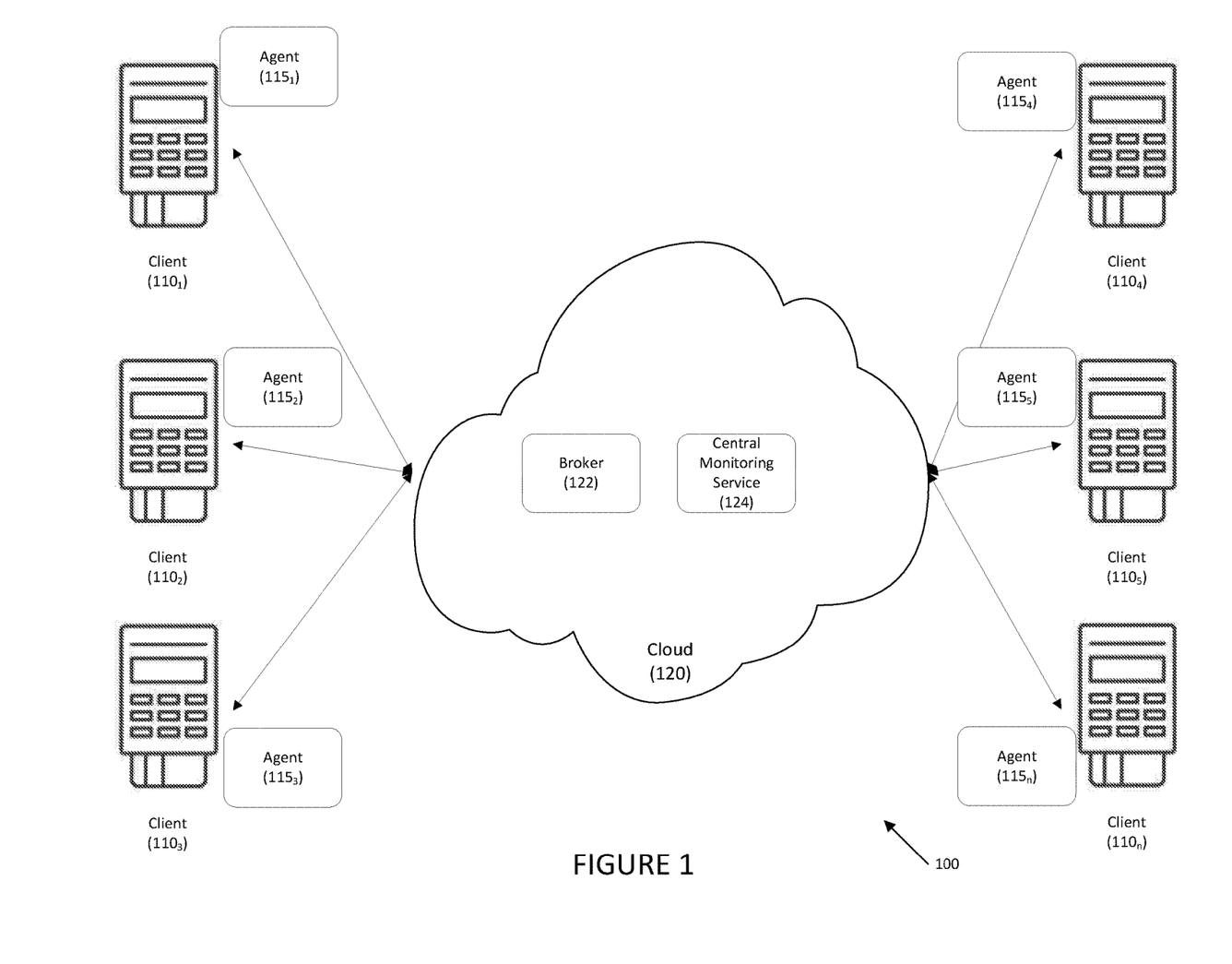
FIG. 1 depicts a system for device connectivity management according to one embodiment.

Referring to FIG. 1, a block diagram of a system for device connectivity management is disclosed according to one embodiment. System 100 may include a plurality of clients ($110_1$, $110_2$, . . . $110_n$), a plurality of agents ($115_1$, $115_2$, . . . $115_n$), cloud 120, broker 122 hosted in cloud 122, and central monitoring service 124 also hosted in cloud 120. Clients $110_1$, $110_2$, . . . $110_n$ may support one or more communication channels, including Ethernet, WiFi, GSM radio, Bluetooth, etc., for communicating with broker 122.

In one embodiment, broker 122 and/or central monitoring service 124 may be hosted one or more datacenter (not shown).

In one embodiment, each client $110_1$, $110_2$, . . . $110_n$ may include an agent $115_1$, $115_2$, . . . $115_n$ that may execute a service that may check in with broker 122 over each supported communication channel. In one embodiment, clients $110_1$, $110_2$, ... $110_n$ may check in at regular intervals, at irregular intervals, on demand, or as otherwise necessary and/or desired.

In one embodiment, browser 122 may implement the MQTT messaging protocol, and clients $110_1$, $110_2$, ... $110_n$ may subscribe to receiving messages from broker 122. In one embodiment, each client $110_1$, $110_2$, ... $110_n$ may subscribe to broker 122 over each of its supported communication channels. For example, if client 115 supports Ethernet, WiFi, and GSM, client 115 may send a separate subscription message to broker 122.

Although the MQTT protocol is discussed herein, it should be recognized that other protocols may be used as is necessary and/or desired.

In one embodiment, each client $110_1$, $110_2$, ... $110_n$ may send a "last will and testament," or LWT, message to broker 122. The LWT message is distributed to all other subscribed clients if the sending client does not respond to a "keep alive" message from broker 122.

In one embodiment, broker 122 may communicate the keep alive message to each client $110_1$, $110_2$, ... $110_n$ over each of the client's subscribed communication channels. For example, if client 115 supports Ethernet, WiFi, and GSM, broker 122 sends a keep alive message to client 115 over each of these communication channels.

Each client $110_1$, $110_2$, ... $110_n$ may respond to the keep alive message within a certain period. If one of the clients $110_1$, $110_2$, ... $110_n$ does not respond over one of its subscribed communication channels, broker 122 may determine that the client or the communication channel is offline.

In one embodiment, central monitoring service 124 may also subscribe to broker 122 and may monitor any messages published by broker 122. In one embodiment, In one embodiment, central monitoring service 124 may receive maintenance update information (e.g., WiFi maintenance), service outage information (e.g., GSM outage information for a certain region), etc. Based on this information and/or messages published by broker 122, central monitoring service 124 may provide status updates, instructions, commands, etc. to clients $110_1$, $110_2$, ... $110_n$ and/or agents $115_1$, $115_2$, ... $115_n$ through any suitable communication network, including email, SMS, etc.

In one embodiment, agents $115_1$, $115_2$, ... $115_n$ may take an appropriate action in response to not receiving a keep alive message from broker 122, such as changing the active communication channel. Agents $115_1$, $115_2$, ... $115_n$. may also execute commands or instructions provided by central monitoring service 124.

Figure 2:
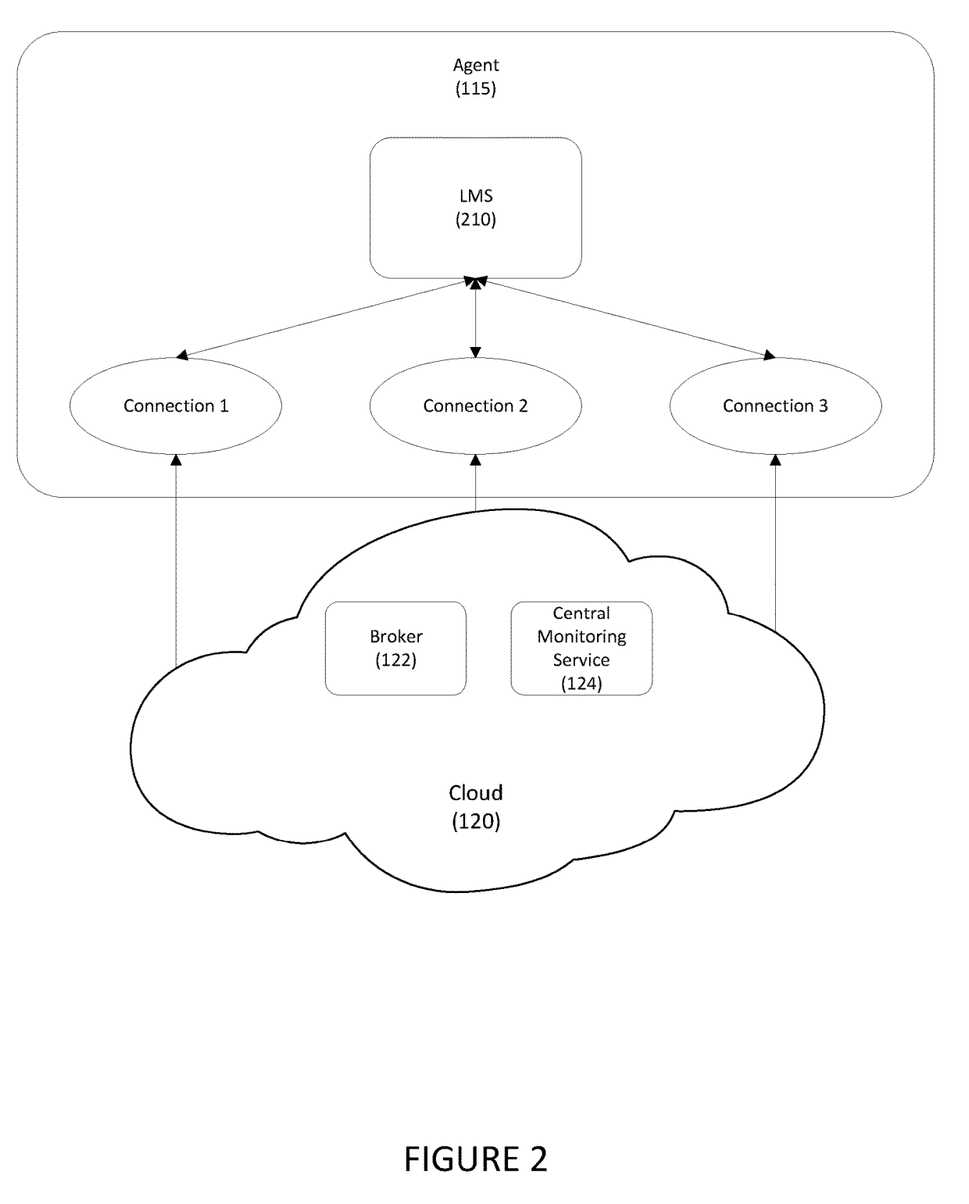
FIG. 2 depicts a schematic diagram of an agent according to one embodiment.

Referring to FIG. 2, a schematic diagram of an agent is provided according to one embodiment. Agent 115 may support a plurality of connections (e.g., Wi-Fi, GSM, Ethernet, etc.). Agent 115 may include local monitoring service (LMS) 210 that subscribes to, and receives event information, from broker 122 in cloud 120.

Although LMS 210 is illustrated as being part of agent 115, it should be recognized that LMS 210 may be part of a separate entity (not shown) that is executed by client 110. Other configurations may be used as is necessary and/or desired.

Agent 115 may manage client 110's connections to broker 122 and may run LMS 210 to act on events that are of interest in managing connectivity. For example, the events received from broker 122 may relay information about connection interfaces, or about configuration, for example, "connective 1 down", or "switch connection 2 to primary/preferred path".

Figure 3:
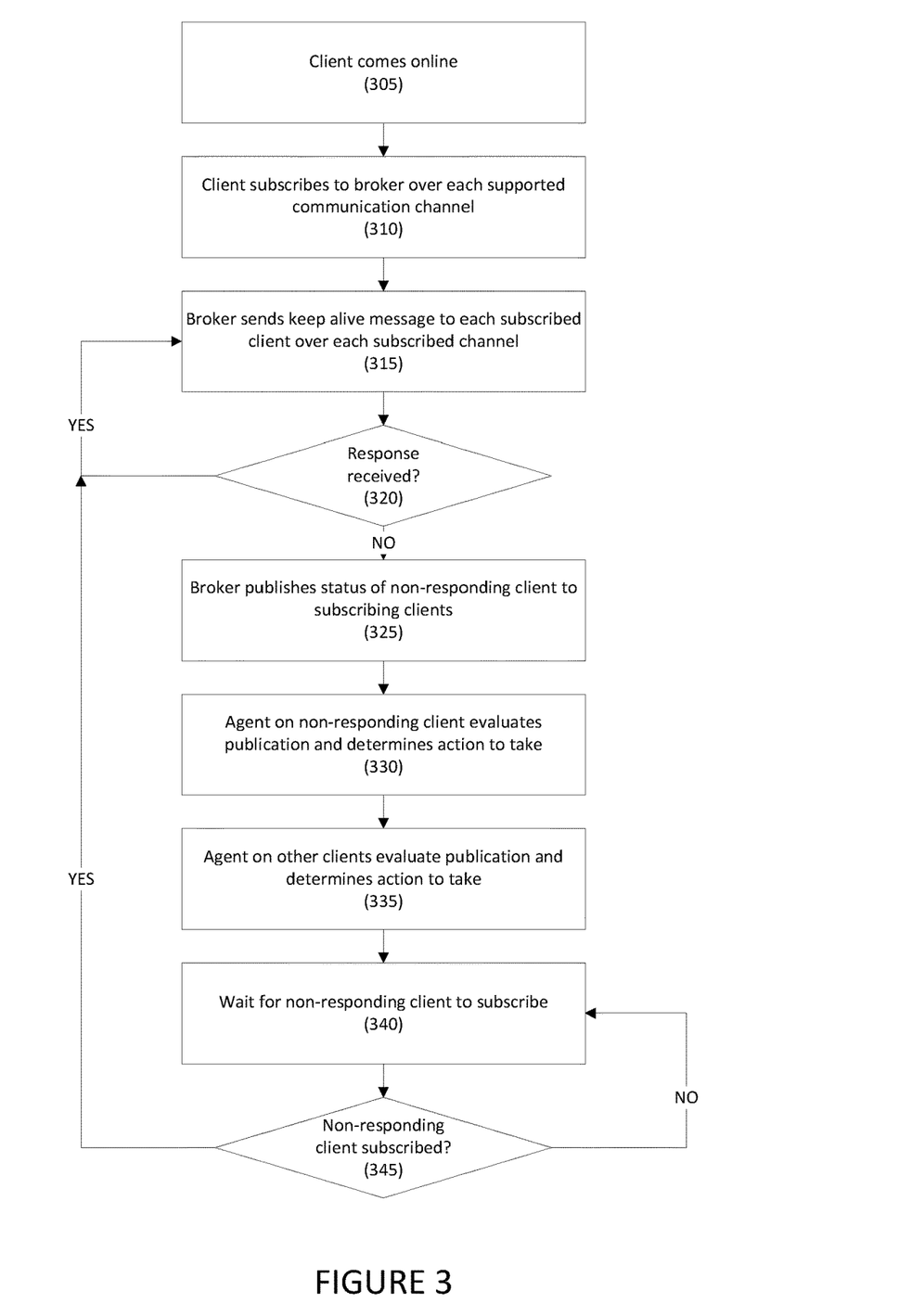
FIG. 3 depicts a method for device connectivity management according to one embodiment.

Referring to FIG. 3, a method for device connectivity management is disclosed according to one embodiment. In step 305, a client, such as a point of sale device, may come online. For example, the client may be powered up.

In step 310, the client may subscribe to a broker over each supported communication channel. For example, the client may subscribe to broker over ethernet, WiFi, GSM, Bluetooth, or any other suitable communication channel.

In one embodiment, the client may communicate a LWT message using the MQTT protocol. Other messaging protocols may be used as is necessary and/or desired.

In step 315, the broker may send a keep alive message to each client over each subscribed communication channel. In one embodiment, the keep alive message may be sent periodically, aperiodically, on demand, or as otherwise necessary and/or desired.

Each client may respond to each keep alive message that it receives over each subscribed communication channel.

In step 320, the broker may determine whether it received responses to the keep alive messages on the subscribed communication channels from each client. If a response is not received on a communication channel, in step 325, the broker may publish a status of the non-responding client(s) and/or communication channel(s) to the responding clients.

In step 330, an agent on the client with a non-responsive communication channel may take an action in response to publication. For example, the client may select a communication channel to use other than the non-responsive communication channel.

In another embodiment, a client may not receive a keep alive message on its GSM communication channel, but may receive a keep alive message on its WiFi communication channel. This may trigger the client to switch or reprioritize the communication channels.

In step 335, agents on other clients may evaluate the publication and may take a suitable action, such as changing communication channels, reprioritizing communication channels, etc. For example, if the agent determines that, in view of the publication, the ethernet communication channel may be compromised, it may switch to the WiFi communication channel.

In step 340, the broker may wait for the non-responding client to subscribe again over the non-responsive communication channel, indicating that the communication channel in question has been restored. If, in step 345, it has, the process may repeat.

Figure 4:
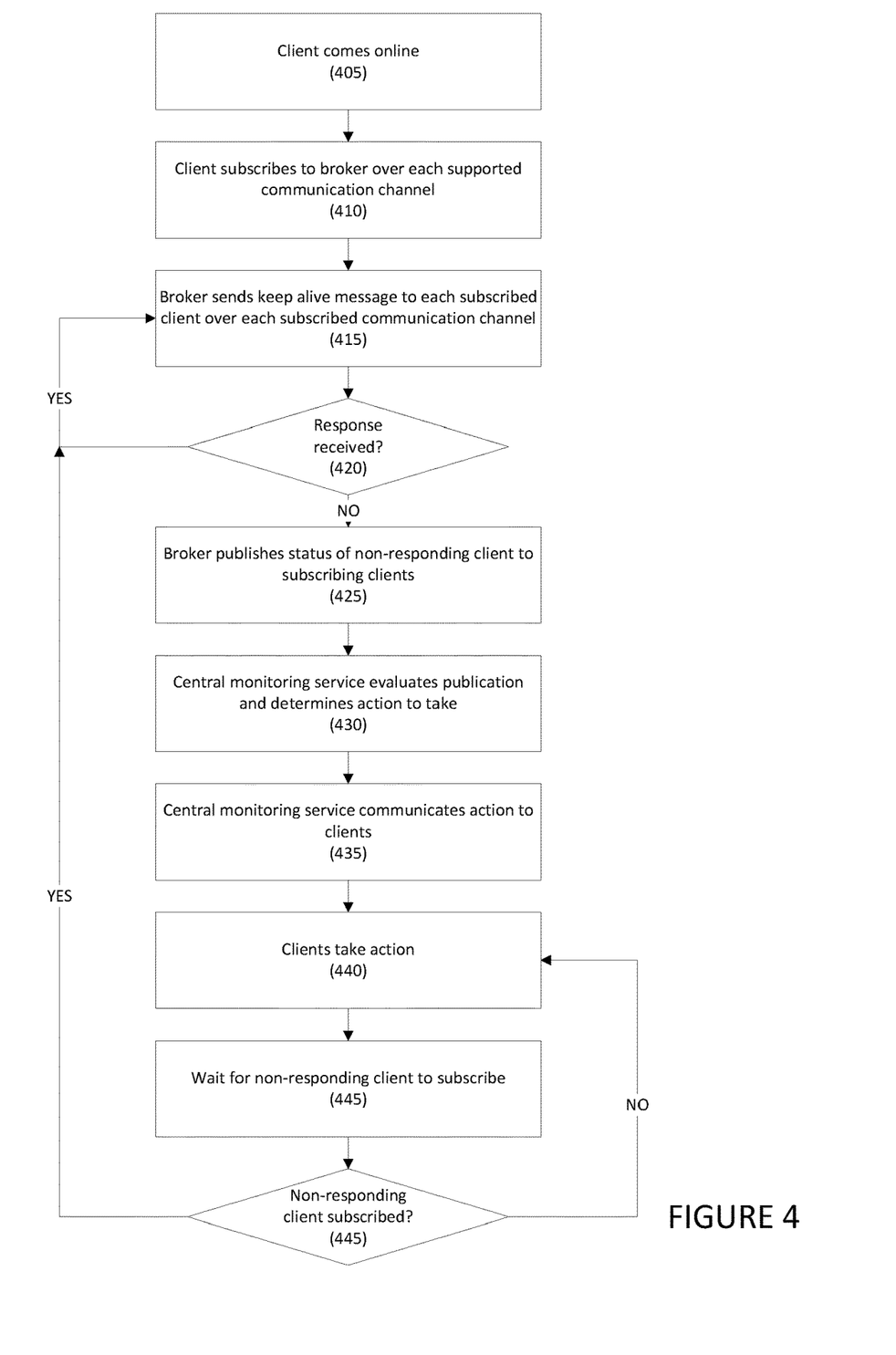
FIG. 4 depicts a method for device connectivity management according to another embodiment.

Referring to FIG. 4, a method for device connectivity management is disclosed according to one embodiment. In step 405, a client, such as a point of sale device, may come online. For example, the client may be powered up.

In step 410, the client may subscribe to a broker over each supported communication channel. For example, the client may communicate over ethernet, WiFi, GSM, Bluetooth, or any other suitable communication channel.

In one embodiment, the client may communicate a LWT message using the MQTT protocol. Other messaging protocols may be used as is necessary and/or desired.

In step 415, the broker may send a keep alive message to each client over each subscribed communication channel. In one embodiment, the keep alive message may be sent periodically, aperiodically, on demand, or as otherwise necessary and/or desired.

Each client may respond to each keep alive message that it receives over each subscribed communication channel.

In step 420, the broker may determine whether it received responses to the keep alive messages on the subscribed communication channels. For example, a client may not receive a keep alive message on its GSM communication channel, but may receive a keep alive message on its WiFi communication channel.

If a response is not received on a communication channel, in step 425, the broker may publish a status of the non-responding client(s) and/or communication channel(s) to the responding clients.

In step 430, a central monitoring service, which may also be a subscriber to the broker, may receive the publication and may determine what action, if any to take. For example, the central monitoring service may instruct the non-responsive client to use a communication channel other than the one that is nonresponsive. As another example, the central monitoring service may instruct other clients to use other communication channels. Other actions may be identified as is necessary and/or desired.

In one embodiment, the central monitoring service may receive other information, such as maintenance information, service outage information, and may use this information and/or the status messages to determine an action to instruct the clients to take. In one embodiment, the information may come from a network provider, from a maintenance provider, etc.

In another embodiment, the central monitoring service may receive updated channel priority policies, and may communicate those policies to the clients.

In step 435, the central monitoring service may communicate the action to the client(s). In one embodiment, the communication may occur over any suitable communication channel, including a separate communication channel, such as SMS, email, etc.

In step 440, the client(s) may take action in response to the communication from the central monitoring service.

In step 445, the broker may wait for the non-responding client to subscribe again over the non-responsive communication channel. If, in step 450, it has, the process may repeat.

Figure 5:
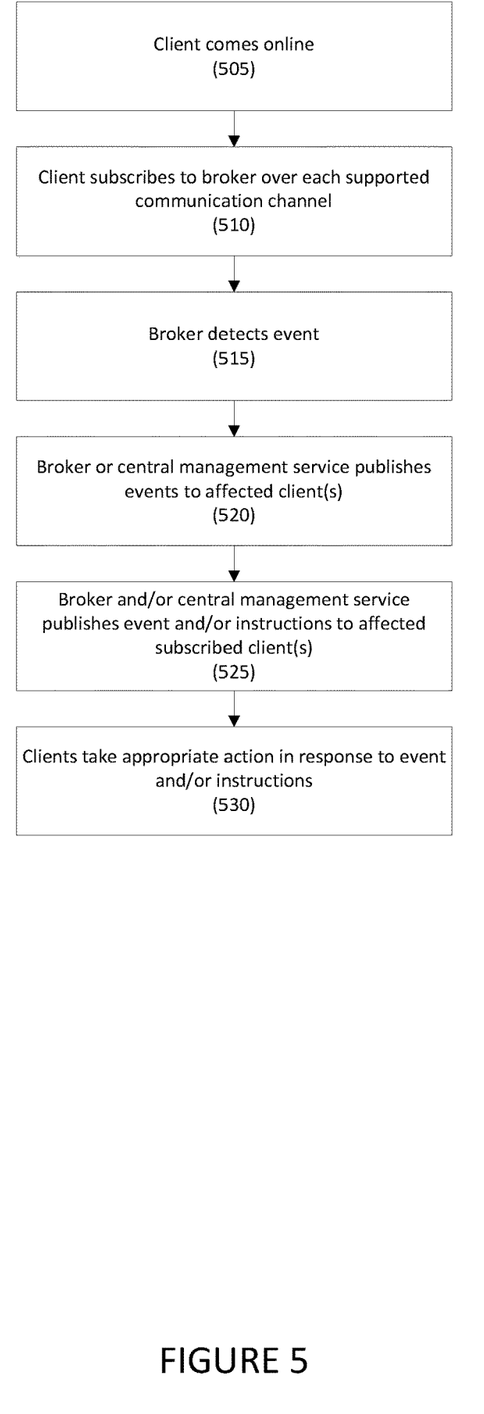
FIG. 5 depicts a method for device connectivity management according to another embodiment.

Referring to FIG. 5, a method for device connectivity management is disclosed according to one embodiment.

In step 505, a client, such as a point of sale device, may come online. For example, the client may be powered up.

In step 510, the client may subscribe to a broker over each supported communication channel. For example, the client may communicate over ethernet, WiFi, GSM, Bluetooth, or any other suitable communication channel.

In one embodiment, the LMS on the client may subscribe to the broker.

In one embodiment, the client may communicate a LWT message using the MQTT protocol. Other messaging protocols may be used as is necessary and/or desired.

In step 515, the broker may detect an event from the broker. In one embodiment, the event may be an event that affects communications, such as a GSM jam or cellular outage event, etc. In another embodiment, the event may be a maintenance event (e.g., WiFi maintenance), a security event (e.g., security keys compromised, etc.). Any other suitable events may be included as is necessary and/or desired.

In step 520, the broker and/or the central management service may communicate the event and/or instructions to the LMS of affected subscribed clients. For example, the central management service may communicate the event type, one or more action to take (e.g., change connection type, such as change from GSM to WiFi), execute maintenance (e.g. switch traffic to different connection type and publish complete message when maintenance is completed), etc.

In step 525, the LMS for the clients may take the appropriate action. For example, an agent executed by the client may interpret the event and may take an appropriate action. In another embodiment, the client may execute the action provided by the central management service.

For example, if the clients execute agents that can act on an event, the are

In one embodiment, machine learning may be used to improve connectivity. For example, data, such as connection times and other telemetry, may be harvested and events may be detected based on past events. In one embodiment, machine learning may be used for the client and/or central management system may use statistical techniques to develop thresholds, rules, etc.

It will be appreciated by persons skilled in the art that the present invention is not limited by what has been particularly shown and described hereinabove. Rather the scope of the present invention includes both combinations and sub-combinations of features described hereinabove and variations and modifications thereof which are not in the prior art. It should further be recognized that these embodiments are not exclusive to each other.

It will be readily understood by those persons skilled in the art that the embodiments disclosed here are susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for device connectivity management, comprising:
    a plurality of client devices, each client device supporting a plurality of communication channels; and
    a broker in communication with each of the client devices over each supported communication channel, the broker comprising at least one computer processor;
    wherein:
        each client device sends a subscription message to the broker over each of the client device's supported communication channels;
        the broker initiates and sends, periodically or a periodically, each subscribed client device a keep alive message over each of the subscribed client device's subscribed supported communication channels;
        each subscribed client device responds to the keep alive message over each of the subscribed client device's subscribed supported communication channels that received the keep alive message;
        the broker publishes a status message comprising a status of non-responding subscribed client devices and a status of each non-responding communication channel of each of the subscribed client devices to each subscribed client device over each subscribed client device's subscribed supported communication channels;

one of the plurality of subscribed client devices executes an action in response to the status message, wherein the one of the plurality of subscribed client devices is a non-responding subscribed client device or a responding subscribed client device with a non-responding supported communication channel.

2. The system of claim 1, wherein at least one of the plurality of subscribed client devices executes an agent.

3. The system of claim 2, wherein the agent executes the action.

4. The system of claim 1, wherein the communication channels comprise ethernet, Wi-Fi, GSM radio, and Bluetooth.

5. The system of claim 1, wherein the action is for the subscribed client device to change from a first communication channel to a second communication channel.

6. The system of claim 1, wherein the action is for the subscribed client device to perform maintenance.

7. The system of claim 1, further comprising a central monitoring service configured to instruct one of the plurality of subscribed client devices that responded to the keep alive message based on the status message and other information, and wherein the one of the plurality of subscribed client devices executes the action in response to the instruction from the central monitoring service.

8. The system of claim 1, wherein the plurality of client devices comprise a plurality of point of sale devices.

9. A method for device connectivity management, comprising:
in an information processing apparatus comprising at least one computer processor:
receiving, from a plurality of client devices and over a plurality of communication channels supported by each client device, a subscription message;
initiating and communicating, periodically or a periodically, over each subscribed supported communication channel for each subscribed client device, a keep alive message;
receiving a response to the keep alive message from each client device over each of the subscribed client device's subscribed supported communication channels that received the keep alive message; and
publishing a status message comprising a status of non-responding subscribed client devices and a status of each non-responding communication channel of each of the subscribed client devices to each subscribed client device over each subscribed client device's subscribed supported communication;
wherein one of the plurality of subscribed client devices executes an action in response to the status message and the one of the plurality of subscribed client devices is a non-responding subscribed client device or a responding subscribed client device with a non-responding supported communication channel.

10. The method of claim 9, wherein an agent executed by the one of the plurality of subscribed client devices executes the action.

11. The method of claim 9, wherein the communication channels comprise ethernet, Wi-Fi, GSM radio, and Bluetooth.

12. The method of claim 9, wherein the action is for the one of the plurality of subscribed client devices to change from a first communication channel to a second communication channel.

13. The method of claim 9, wherein the action is for the one of the plurality of subscribed client devices to perform maintenance.

14. The method of claim 9, further comprising a central monitoring service instructing one of the plurality of subscribed client devices that responded to the keep alive message based on the status message and other information and wherein the one of the plurality of subscribed client devices executes the action in response to the instruction from the central monitoring service.

15. The method of claim 9, wherein the plurality of client devices comprise a plurality of point of sale devices.

16. A method for device connectivity management, comprising:
in a client device comprising at least one computer processor:
sending, to a broker comprising at least one computer processor, a subscription message over a plurality of communication channels supported by the client device;
receiving, periodically or aperiodically and from the broker and over each subscribed supported communication channel, a keep alive message, wherein the broker is configured to initiate the keep alive message;
sending, over each subscribed supported communication channel that received the keep alive message and to the broker, a response to the keep-alive message;
receiving, from the broker and over at least one of the subscribed communication channels, a status message indicating a status of each non-responsive communication channel of the subscribed client device, wherein the broker is configured to publish the status message; and
executing an action in response to the status message, wherein the client device is a responding subscribed client device with a non-responding supported communication channel.

17. The method of claim 16, wherein an agent executed by the client device executes the action.

18. The method of claim 16, wherein the communication channels comprise ethernet, Wi-Fi, GSM radio, and Bluetooth.

19. The method of claim 16, wherein the action is for the client device to change from a first communication channel to a second communication channel.

20. The method of claim 16, wherein the action is for the client device to perform maintenance.

* * * * *